United States Patent
Cina et al.

[11] Patent Number: 5,937,348
[45] Date of Patent: Aug. 10, 1999

[54] CORDLESS COMMUNICATION SYSTEM FOR A PORTABLE COMPUTER MODEM

[75] Inventors: Michael Frank Cina, Hopewell Junction; Ephraim Bemis Flint, Garrison, both of N.Y.; Brian Paul Gaucher, New Milford, Conn.; Young Hoon Kwark, Chappaqua, N.Y.; Modest Michael Oprysko, Mahopac, N.Y.; William Edward Pence, New York, N.Y.; Saila Ponnapalli, Fishkill, N.Y.

[73] Assignee: International Business Machines Corporation, Armonk, N.Y.

[21] Appl. No.: 08/589,077

[22] Filed: Jan. 23, 1996

Related U.S. Application Data

[60] Provisional application No. 60/004,818, Oct. 5, 1995.
[51] Int. Cl.$^6$ .................................................. H04Q 7/20
[52] U.S. Cl. ................ 455/421; 379/100.15; 455/279.1; 455/556
[58] Field of Search .................... 379/58, 59, 61, 379/100, 93.05, 100.15; 455/557, 279.1, 421, 556

[56] References Cited

U.S. PATENT DOCUMENTS

| | | |
|---|---|---|
| 4,752,949 | 6/1988 | Steinbeck et al. . |
| 4,996,715 | 2/1991 | Mauri et al. ............................. 455/421 |
| 5,237,429 | 8/1993 | Zuiss et al. ........................ 379/100.15 |
| 5,353,329 | 10/1994 | Hayashi .................................. 455/556 |
| 5,437,055 | 7/1995 | Wheatley, III ....................... 455/279.1 |
| 5,519,763 | 5/1996 | Namekawa . |

*Primary Examiner*—William Cumming
*Attorney, Agent, or Firm*—Whitham, Curtis & Whitham; Robert P. Tassinari, Esq.

[57] ABSTRACT

A cordless modem comprises a radio pair interfaced to a standard data/fax modem which allows a user of a personal computer to wirelessly connect to a telephone line. One end of the radio pair is a remote unit interfaced to the modem contained within the PC while the other end is a base unit connected to a standard telephone wall jack. This arrangement allows the user the convenience and freedom of using a PC, laptop, personal digital assistant, etc., within several hundred feet of a phone jack without being encumbered by a cord. A warning alarm on the remote unit informs the user when the signal strength between the radio pair is below a threshold value. Additionally, the base unit may be equipped with two spatially separated antennas to help mitigate the effects of signal fading.

18 Claims, 4 Drawing Sheets

(A) REMOTE UNIT

CORDLESS COMMUNICATION SYSTEM FOR A PORTABLE COMPUTER MODEM

Priority is claimed from U.S. Provisional Application No. 60/004,818 filed Oct. 5, 1995.

BACKGROUND OF THE INVENTION

1. Field of the Invention

The present invention generally relates to a cordless modem and, more particularly, to a high-speed, cordless data/facsimile modem wirelessly connecting a portable computer modem to a nearby telephone jack.

2. Background Description

Many personal computers (PCs) are equipped with a modem which permits data communications to other computers via standard telephone lines. A modem converts and compresses a high-speed, digital, serial data stream from a computer into a complex analog modulated signal that can be carried on standard telephone line. Present modem technology makes it possible to send data streams as fast as 28.8 kbps over the telephone network. Modern modems and modem software enable the modem to perform additional functions such as the ability to send and receive facsimile data. Modems with facsimile capabilities are typically referred to simply as data/fax modems.

Standard PCs, are typically situated at fixed location, such as a desk-top, and are not moved very often. A modem, either internal or external to the PC, is physically connected to a standard modular telephone wall jack via a telephone cord. Hence, the user is required to operate the computer in the proximity of a phone outlet or telephone wall jack since, the user's computer is physically tied to the wall. Cord connections work well for most desk-top PCs installations without many drawbacks, except that perhaps a telephone wall jack may need to be installed so as to avoid running a long extension cord around the room.

Telephone cords are, however, undesirable for portable or mobile computers, such as, for example, lap-tops, palm-tops, and notebooks, which enable computing anytime, anywhere. Many public facilities, such as hotels, and convention centers, provide telephone data jacks into which its patrons can plug their mobile computer's modem to gain access to the telephone network. However, often these jacks are in inconvenient places which require long cords to be routed across isles and walkways. This is potentially dangerous situation since not only may passersby trip on the cord and be hurt, but damage may result to the computer or modem in the process. Even in a private home or office situation, it would be nice to be able to roam from room-to-room without being encumbered by a cord.

In order to eliminate this problem and in order to further facilitate the growing demand for mobile computing there has been significant development of technology to provide wireless access to the telephone system. Today, cellular modems exist which provide wireless connectivity to cellular networks. For example, U.S. Pat. Nos. 4,972,457 and 5,353,334 to O'Sullivan, U.S. Pat. No. 5,020,090 to Morris, U.S. Pat. No. 5,408,520 to Clark et al., and European Patent Application 0,622,924 to Harrison are all directed to cellular modems. Normally, modems of this type are not themselves cellular, but rather, are simply adapted to plug into the user's cellular telephone which actually communicates with the cellular base station.

Cellular modems offer great freedom for mobile computers since they can connect to the telephone network over a wide geographic area. The user is typically within several kilometers of a cellular base station which in turn is connected to a standard land-line telephone network.

Unfortunately, there are numerous disadvantages to cellular modems. Not the least of which is that the user must be a subscriber to a cellular service and pay charges for the connection. This tends to be expensive. The cellular modem hardware is constructed to comply with the requirements of a particular cellular network, such as the AMPS (Advanced Mobile Phone System) cellular network, and therefor tends to be expensive. Cellular modems are most convenient and cost effective only for those mobile users that are far from standard telephone lines.

As is readily apparent, a more convenient, less expensive means for cordless interconnection to standard telephone lines is needed.

SUMMARY OF THE INVENTION

It is therefore an object of the present invention to provide a cordless data/fax modem for cordlessly connecting a computer to a nearby telephone wall jack.

It is yet another object of the present invention to provide a base unit connected to a standard telephone wall jack and remote unit connected to a modem for communicating with the base unit over a radio frequency (RF) link.

It is yet another object of the present invention to provide a modem with a warning alarm for informing the user when the RF signal strength has fallen below a threshold value.

The cordless modem of the present invention comprises a radio pair interfaced to a standard data/fax modem and to a telephone wall jack which allows a user of a personal computer to wirelessly connect to a household telephone line. One end of the radio pair is a remote unit interfaced to the modem contained within the PC while the other end is a base unit plugged into a standard telephone wall jack. This arrangement allows the user the convenience and freedom of using a PC, laptop, notebook, personal digital assistant, etc., within several hundred feet of a phone jack without being encumbered by a cord. In a typical home situation the user could initiate a call through the cordless link to an online service, work, or any other service from their kitchen, bedroom, family room, or even outdoors without having to be right next to a phone jack. To insure reliable communications, a warning alarm on the remote unit, such as a light or an audible signal, informs the user when the signal strength between the radio pair is below a threshold value. Additionally, the base unit may be equipped with two or more spatially separated antennas to help mitigate the effects of signal fading.

The flexibility of the cordless data/fax modem is even more advantageous with small, portable computers which are designed to be mobile and naturally carried from room to room. Advantages may also be seen by those where installation of additional phone outlets may be impractical or too costly.

The cordless modem also provides the flexibility of "dual mode use" allowing the user to use the modem wired or cordless. In either case, the user only pays the typical fees associated with residential phone usage. The cordless modem of the present invention takes advantage of, but is not limited to, the newly allocated unlicensed bands such as 902–928 MHz, 2.4–2.483 GHz, etc.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
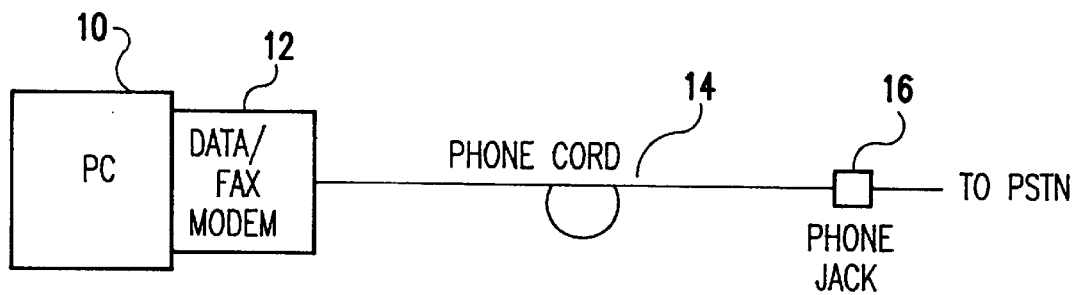
FIG. 1 is a block diagram of a telephone cord connection arrangement used to connect a typical wired modem to a telephone wall jack.

Referring now to the drawings, and more particularly to FIG. 1, there is shown a modem connected to a telephone wall jack with a telephone cord. A computer 10 is equipped with a data/fax modem 12. A physical cord 14 connects the modem 12 to a standard telephone wall jack 16 which is, in turn, connected to the telephone network. As is apparent from the illustration, since there is a physical tie between the computer 10 and the wall jack 16, mobility is severely limited.

Figure 2:
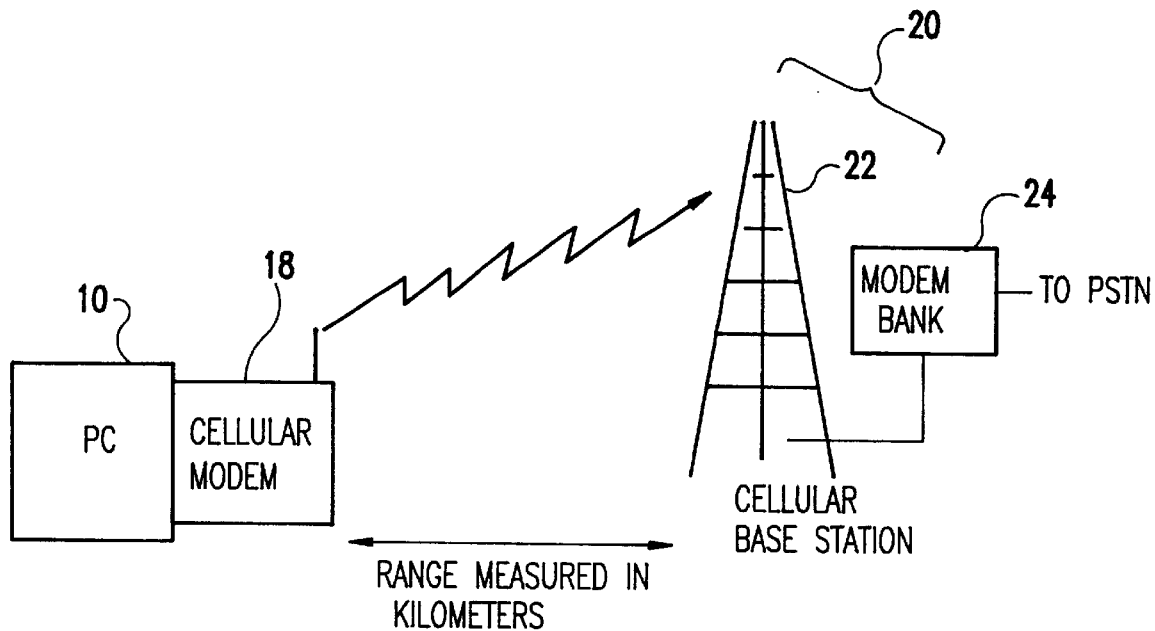
FIG. 2 is a block diagram of a cellular modem configuration allowing a computer access to a cellular telecommunications network.

FIG. 2 shows a cellular modem 18 for connecting a computer 10 to a cellular telecommunications network 20. The user must be located inside of a "cell" which is typically a several kilometers radius around a base station 22 which provides connectivity to the cellular telecommunications network which is in turn connected to a modem bank 24 and then to the standard land-line telephone network.

As mentioned above, while a cellular modem offers great mobile freedom, it suffers from a limited baud rate and further is quite expensive to connect relative to standard land-line telephone charges. Hence, in instances where there is access to a land-line telephone jack nearby, it would be preferable to connect to it rather than to the cellular telecommunications network.

Figure 3:
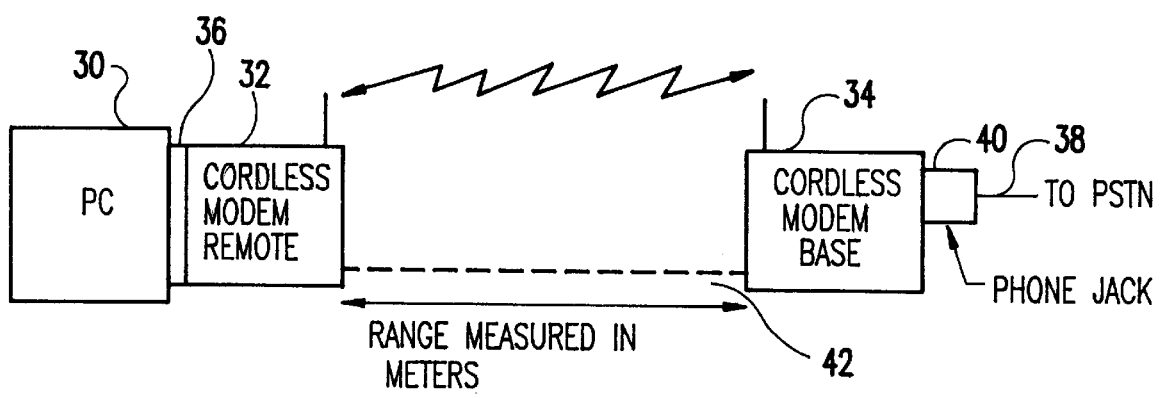
FIG. 3 is a block diagram of the cordless modem according to the present invention.

FIG. 3 shows the cordless data/fax modem according to the present invention. The cordless data/fax modem comprises a remote transceiver unit 32 which is a radio connected to a base transceiver unit 34. The remote transceiver unit 32 is connected to a standard data/fax modem 36 which allows a user of a personal computer 30 to wirelessly connect to a telephone line 38 via a standard modular wall jack 40. This allows the user the convenience and freedom of using a PC 30 within several hundred feet of a phone jack 40 without being limited by a cord.

The cordless modem also provides the flexibility of "dual mode use" allowing the user to use the modem in wired mode wherein a standard cord 42 can be used to physically connect the remote data/fax modem 36 to the standard modular wall jack 40.

Figure 4:
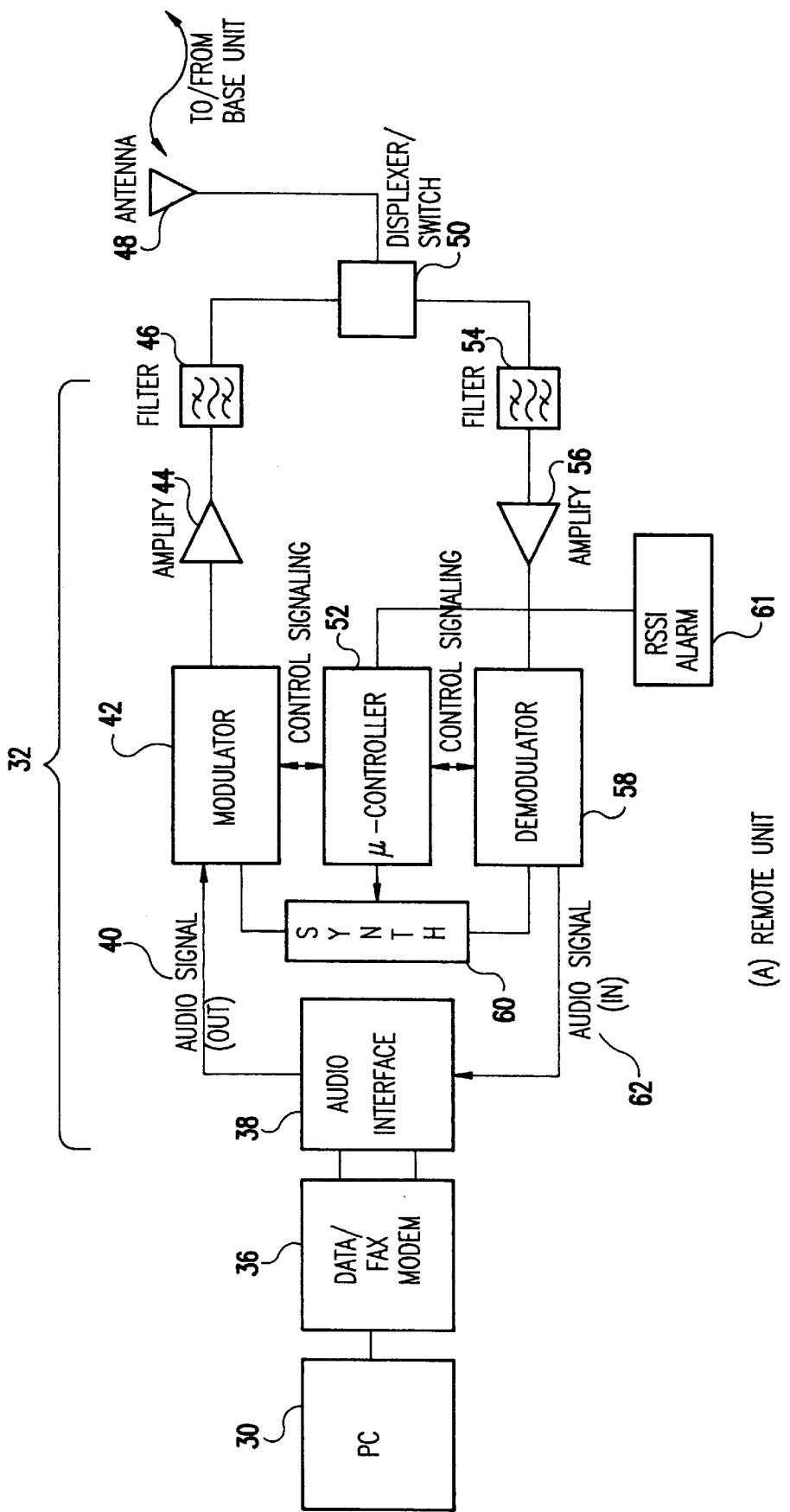
FIG. 4 is a block circuit diagram of the remote unit according to the present invention.

Referring now to FIG. 4 there is shown a block circuit diagram of the remote unit according to the present invention. An audio interface 38 connects to a data/fax modem 36 which in turn is connected to a PC 30. When transferring data from the computer 30, the audio interface outputs a baseband analog signal 40 to a modulator 42. The audio signal 40 is effectively confined to a frequency band from approximately 300 HZ to 3500 Hz. A transceiver places the analog signal 40 on an FM carrier at the modulator 42. A synthesizer module 60 is used to generate the RF frequency for modulation. The output of the modulator 42 passes through an amplifier 44 and a filter 46 and to an antenna 48. A duplexing circuit, such as a duplexer or diplexer 50, directs the amplified and filtered signal to the antenna 48 for transmission to the base transceiver unit 34. The diplexer 50 allows the cordless modem of the present invention to have full duplex capabilities. That is, it is used to separate received and transmitted signals such that signals to be transmitted are directed to the antenna 48, while signals received by the antenna 48 are directed towards the demodulator 58. Hence, the cordless data/fax modem of the present invention can receive and transmit data simultaneously.

When receiving data over the telephone line to the PC 30, a modulated data signal is received from the base transceiver unit 34 by the antenna 48. The diplexer 50 routes the signal to the filter 54, amplifier 56, and demodulator 58. The demodulator 58 converts the signal to a baseband signal which is input into audio interface 38 and then to the data/fax modem 36. The cordless modem provides security over a casual eavesdropper as the transmitted signal is a complex modem code directly generated by the modem. In addition, data encryption may be used for added security.

Radio frequency, or RF, propagation by its very nature can create regions or zones of poor signal strength, commonly referred to as "dead zones". The present invention provides the user with a visual or audio feedback of the relative signal strength indicator (RSSI) value being received by the base transceiver unit 34 and by the remote transceiver unit 32. For example, by setting an RSSI alarm 61, such as a light emitting diode (LED) indicator, to flash when the signal strength decreases below a certain predetermined value, the user will know to move his PC or modem slightly to improve signal reception. The microcontroller 52 can also be used to provide additional status indicators through the used of LEDs to provide a continuous time signal strength indication.

Figure 5:
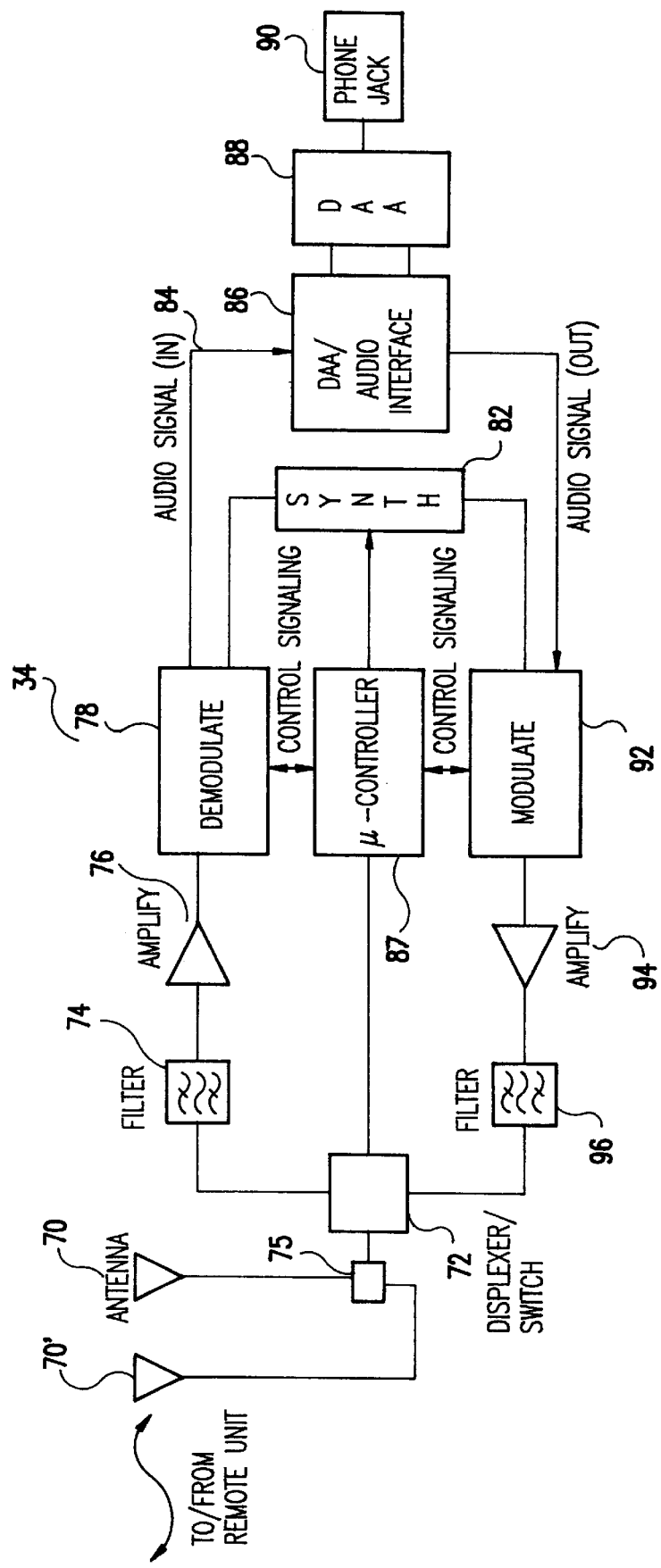
FIG. 5 is a block circuit diagram of the base unit according to the present invention.

Referring now to FIG. 5 there is shown a circuit block diagram of the base transceiver unit 34 according to the present invention. The base transceiver unit 34 is substantially the mirror image of the remote transceiver unit 32. When receiving a signal from the remote transceiver unit 32, the antenna 70 directs the signal to a duplexing circuit, such as a diplexer or duplexer 72, which routes the signal through a filter 74, an amplifier 76, and a demodulator 78, all under the control of a microcontroller 80. If the received signal is encrypted for security reasons, the encryption is stripped prior to sending it to the user. The synthesizer 82 is used to generate the frequency for demodulation.

An audio signal 84 is input to the DAA/audio interface 86 which is input into the DAA (Data Access Arrangement) module. Every country's telephone system has what is commonly known a Data Access Arrangement or, simply DAA. DAA is the standard or the format that a modem is required to use when communicating over a particular phone system. The DAA module 88 is connected to a standard telephone wall jack 90.

When transmitting data from a telephone line via the wall jack 90 to the remote transceiver unit 32, the data format is interpreted with the DAA module 88. The DAA/audio interface 86 outputs a baseband audio signal to a modulator 92. The output of the modulator 92 passes through an amplifier 94 and a filter 96 and to an antenna 70. A diplexer 72, directs the amplified and filtered signal to the antenna 70 for transmission to the remote transceiver unit 32. In addition, it may be desirable, in certain instances, to include a second antenna 701. The use of two spatially separated antennas on the base transceiver unit 34, under the control of the microcontroller 84, may be provided to help mitigate the effects of signal fading. The microprocessor 84 can monitor the signal strength on both antennas, and choose the antenna having the strongest signal. For example, a switch 75 may be used to switch back and forth between antennas 70 and 70'.

In operation, a radio protocol is established to enable the base transceiver unit 34 and the remote transceiver unit 32 to recognize each other. Control signals are sent between the units to establish that an outgoing call is desired or that an incoming call has been detected. This requires the generation of OFFHOOK, ONHOOK, RING, DIAL TONE, TONE, etc. signals by the transceiver units. This function is carried out by the combination of the microcontrollers 52 and 87.

The transceivers shown in FIGS. 4 and 5 allow for full duplex operation. That is, the transceivers can simultaneously transmit and receive data. However, it is also possible to use a time division duplex (TDD) architecture where the communication channel is half-duplex. That is, the transceiver either transmits or receives. This modification may be accomplished by a replacing the duplexing circuits 50 and 72 with switches which are under the control of the microcontrollers 52 and 87, respectively. Because the modem link protocol requires two-way communication, it is essential that in half-duplex mode the transceivers switch between transmit and receive sufficiently fast so as not to disrupt standard modem operation. For example, a switch rate of 100 KHz is sufficient to enable half-duplex operation of the transceivers and maintain a good modem connection.

The remote transceiver unit 32 of the data/fax modem of the present invention may be packaged in a PCMCIA form (Personal Computer Memory Card International Association). This type of memory card is designed to be plugged directly into an available slot on a PC. The remote transceiver unit 32 may also be designed as a separate boxed package which can be mounted on the back of a laptop display and connected via a cord to the data/fax modem. The remote transceiver unit 32 may also be designed as a single chip or small combination of chips placed directly on a system board.

The base transceiver unit 34 is contained in a single unit and may be powered by either a battery or an AC adapter. The remote transmit and base receive channel are centered near 907 MHz (in the ISM band) while the base transmit and remote receive channel are centered near 927 MHz (also in ISM band). The audio and control signals are modulated onto an FM carrier and transmitted over the air. Control signals exchanged between remote and base radio units, 32 and 34, using a frequency shift key (FSK) code which the demodulators, 58 and 78, are also designed to decode. The transmitted signal levels are kept below 50 $\mu$V/m at 3 meters to comply with the FCC Part 15 low power rules. Receiver sensitivity is kept to better than −90 dBm at 24 dB SINAD in order to maintain a good signal fidelity and range up to several hundred feet between the base 34 and remote 32 transceiver units.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A radio pair for cordlessly connecting a portable computer modem to a telephone line, comprising:

a base unit comprising:
      a connection for a hard-wired telephone line; and
      a first radio transceiver for transmitting and receiving computer data to/from a distant computer carried over the hard-wired telephone line; and a remote unit comprising:
      a telephone jack for connection to a portable computer modem, said telephone jack appearing to the portable computer modem to be the hard-wired telephone line; and
      a second radio transceiver for transmitting and receiving the computer data to and from said first radio transceiver in said base unit, wherein the portable computer modem is cordlessly connected to the hard-wired telephone line.

2. A radio pair as recited in claim 1 wherein said remote unit comprises an alarm for indicating when a relative signal strength indicator value from said base unit is below a threshold value.

3. A radio pair as recited in claim 2 wherein said alarm comprises at least one light emitting diode.

4. A radio pair as recited in claim 2 wherein said alarm is an audible alarm.

5. A radio pair as recited in claim 1 wherein said base unit comprises at least two antennas.

6. A radio pair as recited in claim 5 wherein said at least two antennas are spatially diverse and wherein said microprocessor may switch between said at least two spatially separated antennas according to which antenna has a strongest signal.

7. A radio pair as recited in claim 1 wherein said base unit comprises:
   at least one antenna for establishing a radio connection with said remote unit;
   duplexer means, connected to said at least one antenna, for directing an incoming data signal to a demodulator and for directing an outgoing data signal from a modulator to said at least one antenna;
   a microcontroller for generating control signals to said demodulator and to said modulator;
   an audio interface connected to said modulator and to said demodulator, said audio interface for receiving a baseband audio signal from said demodulator and supplying a baseband audio signal to said modulator; and
   a data access arrangement (DAA) module connected to said audio interface, said data access arrangement (DAA) module connecting to the hard-wired telephone line.

8. A radio pair as recited in claim 1 wherein said base unit comprises:
   at least one antenna for establishing a radio connection with said remote unit;
   a switch connected to said at least one antenna to direct an incoming data signal to a demodulator and to direct an outgoing data signal from a modulator to said at least one antenna;
   a microcontroller for controlling said switch and for generating control signals to said demodulator and to said modulator;
   an audio interface connected to said modulator and to said demodulator, said audio interface for receiving a baseband audio signal from said demodulator and supplying a baseband audio signal to said modulator; and
   a data access arrangement (DAA) module connected to said audio interface, said data access arrangement (DAA) module connecting to the hard-wired telephone line.

9. A radio pair as recited in claim 1 wherein said remote unit comprises:
- an antenna for establishing a radio connection with said base unit;
- duplexer means, connected to said antenna, for directing an incoming data signal from said base unit to a demodulator and for directing an outgoing data signal from the modem to a modulator;
- a microcontroller for generating control signals to said demodulator and to said modulator;
- an audio interface connected to said modulator and to said demodulator, said audio interface for receiving a baseband audio signal from said demodulator and supplying a baseband audio signal to said modulator, said audio interface being connected to the modem; and
- alarm means for alerting a user when a relative signal strength indicator value from said base unit has fallen below a threshold value.

10. A radio pair as recited in claim 1 wherein said remote unit comprises:
- an antenna for establishing a radio connection with said base unit;
- a switch connected to said antenna to direct an incoming data signal from said base unit to a demodulator and to direct an outgoing data signal from the modem to a modulator;
- a microcontroller for controlling said switch and for generating control signals to said demodulator and to said modulator;
- an audio interface connected to said modulator and to said demodulator, said audio interface for receiving a baseband audio signal from said demodulator and supplying a baseband audio signal to said modulator, said audio interface being connected to the modem; and
- alarm means for alerting a user when a relative signal strength indicator value from said base unit has fallen below a threshold value.

11. A radio pair as recited in claim 1 wherein said remote unit is packaged in a Personal Computer Memory Card Interface Association (PCMCIA) card.

12. A radio pair as recited in claim 1 wherein said remote unit is packaged in a module which is wired to a modem.

13. A radio pair as recited in claim 1 wherein said remote unit is integrated on a system board.

14. A radio pair as recited in claim 1 wherein transmitted signal levels of said first transceiver and said second transceiver are below 50 $\mu$V/m at 3 meters.

15. A cordless communication system for cordlessly connecting a portable computer modem to a hard-wired telephone line, comprising:
- a base unit for connection to a hard-wired telephone line and a remote unit having a telephone jack for connection to a portable computer modem;
- a first radio transceiver in said base unit; and
- a second radio transceiver in said remote unit for communicating with said first radio transceiver,
- said first radio transceiver for modulating a first analog signal from the hard-wired telephone line onto a frequency modulation carrier and for demodulating a second signal received from said second radio transceiver in said remote unit, and transmitting said second signal over the hard-wired telephone line,
- said second radio transceiver for modulating an analog signal from the portable computer modem on a frequency modulation carrier and for demodulating a signal received from said first radio transceiver in said base unit.

16. A cordless communication system for cordlessly connecting a portable computer modem to a hard-wired telephone line as recited in claim 15 wherein said remote unit further comprises a relative signal strength indicator module for indicating signal strength between said first radio transceiver and said second radio transceiver.

17. A cordless communication system for cordlessly connecting a portable computer modem to a hard-wired telephone line as recited in claim 15 wherein said base unit comprises two antennas for mitigating signal fade.

18. A cordless communication system for cordlessly connecting a portable computer modem to a hard-wired telephone line as recited in claim 15, further comprising:
- a cord jack on said base unit and a cord jack on said remote unit for allowing said base unit and said remote unit to communicate via a cord.

* * * * *

UNITED STATES PATENT AND TRADEMARK OFFICE
CERTIFICATE OF CORRECTION

PATENT NO. : 5,937,348                  Page 1 of 1
DATED : August 10, 1999
INVENTOR(S) : Michael F. Cina et al.

It is certified that error appears in the above-identified patent and that said Letters Patent is hereby corrected as shown below:

<u>Title page,</u>
Item [75] Inventors, add: Richard Orville LaMaire, Yorktown Heights, N.Y.

Signed and Sealed this

Second Day of October, 2001

*Attest:*

*Nicholas P. Godici*

*Attesting Officer*

NICHOLAS P. GODICI
*Acting Director of the United States Patent and Trademark Office*